United States Patent
Wolf et al.

(10) Patent No.: US 10,267,157 B2
(45) Date of Patent: Apr. 23, 2019

(54) ROTATING BLADE

(71) Applicant: MTU Aero Engines AG, Munich (DE)

(72) Inventors: Kaspar Wolf, Munich (DE); Klaus Wittig, Roehrmoos (DE); Marcus Woehler, Inning am Ammersee (DE); Martin Pernleitner, Dachau (DE); Wilfried Schuette, Oberhaching-Furth (DE)

(73) Assignee: MTU Aero Engines AG, Munich (DE)

( * ) Notice: Subject to any disclaimer, the term of this patent is extended or adjusted under 35 U.S.C. 154(b) by 227 days.

(21) Appl. No.: 15/297,361

(22) Filed: Oct. 19, 2016

(65) Prior Publication Data
US 2017/0114644 A1    Apr. 27, 2017

(30) Foreign Application Priority Data
Oct. 26, 2015    (EP) .................................... 15191393

(51) Int. Cl.
| F01D 5/14 | (2006.01) |
| F04D 29/32 | (2006.01) |
| F01D 5/22 | (2006.01) |

(52) U.S. Cl.
CPC .............. *F01D 5/141* (2013.01); *F01D 5/225* (2013.01); *F04D 29/324* (2013.01); *F05D 2220/323* (2013.01); *F05D 2240/307* (2013.01); *Y02T 50/673* (2013.01)

(58) Field of Classification Search
CPC ...... F05D 2200/00; F05D 2200/26–2200/264; F05D 2220/323; F05D 2240/307; F01D 5/141–5/143; F01D 5/14; F01D 9/04; F01D 5/225; F01D 5/30; F04D 29/322; F04D 29/324
See application file for complete search history.

(56) References Cited

U.S. PATENT DOCUMENTS

| 4,152,094 A * | 5/1979 | Honda .................. F04D 29/164 |
| | | 415/119 |
| 2009/0191047 A1* | 7/2009 | Schlinker .............. F04D 29/666 |
| | | 415/119 |
| 2016/0348684 A1* | 12/2016 | Kuhns ....................... F01D 1/06 |

FOREIGN PATENT DOCUMENTS

| EP | 0661413 A1 | 7/1995 |
| EP | 0704602 B1 | 2/2001 |
| EP | 1505302 A1 | 2/2005 |
| EP | 1259711 B1 | 8/2005 |
| EP | 2226468 A2 | 9/2010 |

(Continued)

*Primary Examiner* — Kenneth Bomberg
*Assistant Examiner* — Hakeem M Abdellaoui
(74) *Attorney, Agent, or Firm* — Harlow, Josephs & Holmes, Ltd.

(57) ABSTRACT

The present invention relates to a rotating blade for a turbomachine, in particular a compressor stage or a turbine stage of a gas turbine, particularly of an aircraft engine, having a blade element for deflecting the flow, with a pressure side and a suction side, these sides being joined by a leading edge and a trailing edge, wherein a stacking axis of the blade element, in the radial direction over a radius r from a root of a blade element at r=0 to a tip of a blade element at r=H, has a course x(r) in a first downstream direction perpendicular to the radial direction and parallel to a principal axis of the turbomachine and has a course y(r) in a second direction perpendicular to the radial direction and to the first direction.

6 Claims, 1 Drawing Sheet

(56) References Cited

FOREIGN PATENT DOCUMENTS

Figure 1:
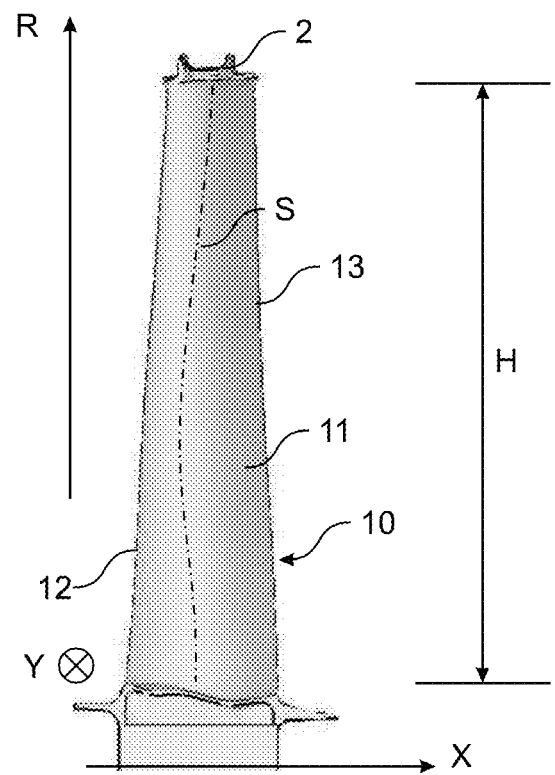

| WO | 2005005784 A1 | 1/2005 |
| WO | 2009103528 A2 | 8/2009 |
| WO | 2012080669 A1 | 6/2012 |

* cited by examiner

ROTATING BLADE

BACKGROUND OF THE INVENTION

The present invention relates to a rotating blade for a turbomachine; a compressor stage or a turbine stage of a gas turbine having at least one such rotating blade; a gas turbine, particularly an aircraft engine, having at least one such compressor stage or turbine stage; as well as a method for designing the blade.

Blade elements of rotating blades particularly serve for deflecting flow, in particular to withdraw work from an operating fluid, particularly exhaust gas, in a turbine stage, or in particular to compress an operating fluid, particularly air that has been sucked in, in a compressor stage.

Its geometric contour has an essential influence on the loading or stressing of the blade or stage.

SUMMARY OF THE INVENTION

An object of an embodiment of the present invention is thus to improve a turbomachine, in particular a gas turbine.

This object is achieved by a rotating blade with the features of the present invention set forth in detail below. These features include a compressor stage or a turbine stage having one or more rotating blades and a gas turbine having at least one compressor stage or one turbine stage described here. Advantageous embodiments of the invention are also set forth in detail below.

According to one aspect of the present invention, one or more rotating blades for a turbomachine, in particular one turbomachine, particularly for a compressor stage or turbine stage, in particular for one compressor stage or one turbine stage, for a gas turbine, in particular for one gas turbine, particularly for an aircraft engine, in particular for one aircraft engine, has or have in each case a blade element for deflecting the flow, this element having a pressure side and a suction side that are joined by a leading edge and a trailing edge.

The blade element can be or will be constructed or defined or designed in the usual technical manner by a row of radially stacked profile sections, in particular concentric or conical relative to an axis of rotation or principal axis of the turbomachine. Profile sections may have, for example, and in particular modified NACA profiles, Clark profiles, DCA profiles (Double Circular Arc), MCA profiles (Multiple Circular Arc) or also other profiles or contours.

The connection line of the geometric foci of the stacked profile sections is designated in the usual way in the art as the so-called stacking or thread axis of the blade element and defines the radial course thereof.

In one embodiment of the present invention, the stacking axis of the blade element in the radial direction (perpendicular to the axis of rotation or the principal axis of the turbomachine), over a radius r from a blade element root at r=0, in particular in a radially innermost profile section of the blade element, up to a tip of the blade element at r=H, in particular in a radially outermost profile section of the blade element, has a course $x(r)$, in a first downstream direction perpendicular to the radial direction and parallel to the principal axis of the turbomachine, this course deviating from a superimposed course $x_l(r)+x_s(r)$, which is composed of an addition of a particularly positive, linear course $$x_l(r)=a_x\cdot(r/H+b_x)$$

and a local sine function, in particular defined different from zero, particularly only over one period, $$x_s(r) = \begin{cases} A\cdot\left[\sin\left(B\cdot\left(\frac{r}{H}+C\right)\right)+1\right] \Leftrightarrow -\frac{\pi}{2} \le B\cdot\left(\frac{r}{H}+C\right) \le \frac{3\cdot\pi}{2} \\ 0 \Leftrightarrow \text{any other} \end{cases}$$

this course at least deviating by a maximum of $0.100\cdot a_x\cdot(1+b_x)$, in particular by a maximum of $0.010\cdot a_x\cdot(1+b_x)$ in a radial region between $r=0.200\cdot H$ and $r=0.400\cdot H$, in particular at least in a radial region between $r=0.100\cdot H$ and $r=0.500\cdot H$, in particular at least in a radial region between $r=0.100\cdot H$ and $r=0.750\cdot H$; and has a course $y(r)$ in a second direction perpendicular to the radial direction and to the first direction, this course deviating from a particularly negative, linear course $$a_y\cdot(r/H+b_y)$$

by a maximum of $0.100\cdot a_y\cdot(1+b_y)$, in particular by a maximum of $0.010\cdot a_y\cdot(1+b_y)$, at least in the radial region between $r=0.200\cdot H$ and $r=0.400\cdot H$, in particular at least between $r=0.100\cdot H$ and $r=0.500\cdot H$, in particular at least between $r=0.100\cdot H$ and $r=0.750\cdot H$.

In other words, the blade elements of one or a plurality of rotating blades, at least in the given radially inner region between $r=0.200\cdot H$ and $r=0.400\cdot H$, in particular at least between $r=0.100\cdot H$ and $r=0.500\cdot H$, in particular at least between $r=0.100\cdot H$ and $r=0.750\cdot H$, have a particularly positive or downstream, so-called x-lean or sweep in the direction of the principal axis of the machine, and a particularly negative, so called (y)-lean in the peripheral direction, wherein the (y)-lean, at least in the given radially inner region, deviates from a purely linear course by at most 1%, in particular at most 0.1%, of a limit value at the tip of the blade element, and the x-lean or sweep, at least in the given radially inner region, deviates from a superimposition of a purely linear course and a single full period of a superimposed sinusoid, by at most 1%, in particular at most 0.1%, of a limit value at the tip of the blade element.

In one embodiment, advantageously, by means of the respective linear course or component, a loading or stressing of the blade root bearing or supporting the blade element, this stressing due to fluid forces, in particular gas forces, acting on the blade element can be advantageously reduced.

By the combination with a superimposed period of a sinusoid in the x-lean or sweep, in one embodiment, advantageously, a stressing of the blade element, by these forces can also be improved in this way; in particular, a stressing at the leading edge can be advantageously reduced.

Thus, by this combination of x-lean or sweep and (y)-lean, in one embodiment, advantageously, a robustness during operation, in particular against FODs, and/or a so-called Goodman margin can be increased or enlarged in the design.

In one embodiment, a radially innermost profile section or the radially innermost profile section is the section of the smallest cylinder concentric to the principal axis of the machine, with the blade element, this innermost profile section intersecting the blade element in at least one point, in particular completely, for the first time; in one embodiment, a radially outermost profile section or the radially outermost profile section correspondingly is the section of the largest cylinder concentric to the principal axis of the machine, with the blade element, this outermost profile section intersecting the blade element in at least one point, in particular still completely; the height of the blade element correspondingly is the radial distance from the radially innermost to the radially outermost profile section.

In one embodiment $0<a_x$ is valid. This is also designated the positive linear x-lean or sweep component, since the first direction is oriented downstream or in the direction of through-flow, and thus the linear x-lean component increases radially outward in the direction of through-flow.

Additionally or alternatively, in one embodiment, $a_y<0$ is valid. This is also designated the negative (y)-lean, wherein, in one embodiment, the first direction, the second direction, and the radial direction from the root of the blade element to the tip of the blade element in this sequence form a valid system, or the radial direction results as the vector product of the first and second directions.

In one embodiment, the stressing of the blade root can be advantageously reduced by such a positive x-lean or sweep and/or negative (y)-lean.

In one embodiment, additionally or alternatively, $A<0$ is valid. In one embodiment, the one-period sine function will be opposite in direction to the linear component, in particular, superimposed such that it reduces the positive x-lean or sweep in the region in which it is different from zero.

In this way, in one embodiment, a stressing of the blade element can be improved; in particular, a stressing on the leading edge can be advantageously reduced.

In one embodiment, the following is valid: $1.800 \cdot \pi \leq B \leq 2.200 \cdot \pi$ or $6.300 \cdot \pi \leq B \leq 7.000 \cdot \pi$. In other words, in one embodiment, the period of the superimposed sinusoid extends, at least substantially, over the entire height of the blade element ($B \approx 2 \cdot \pi$) or approximately 30% of the height of the blade element ($B \approx 2 \cdot \pi / 0.3 \approx 6.7 \cdot \pi$).

It has been shown surprisingly that precisely these period widths advantageously improve the stressing of the blade element; in particular, they can reduce a stressing on the leading edge advantageously.

In one embodiment, the following is valid: $-0.300 \leq C \leq -0.200$ or $-0.100 \leq C \leq -0.050$. In general, in one embodiment, in particular, a maximum, particularly negative value is assigned thereby to the superimposed sinusoid at approximately half the height of the blade element (see $\sin(B(r/H-0.25))+1=\sin(0.25B)+1=\sin(0.5 \cdot \pi)+1=2$), or approximately 15% of the height of the blade element (see $\sin(B(r/H-0.075))+1=\sin(0.075B)+1=\sin(0.5 \cdot \pi)+1=2$), wherein care must be taken that the superimposed sinusoid, based on the displacement "(sin( . . . )+1)", begins at zero and increases in magnitude to a maximum of $2(\cdot A)$.

It has been shown surprisingly that precisely this positioning of the sine period advantageously improves the stressing of the blade element; in particular, it can reduce a stressing on the leading edge advantageously.

In one embodiment, $a_x \leq 0.036 \cdot H$ is valid, in particular $a_x \leq 0.018 \cdot H$ and/or $-0.100 \leq b_x \leq 0.100$, in particular $-0.050 \leq b_x \leq 0.050$. For example, in one embodiment, if the height H of the blade element amounts to approximately 167 mm, then correspondingly, in one embodiment, the linear component of the x-lean or sweep at the tip of the blade element, for $b_x=0$, amounts to approximately $0.036 \cdot 167$ mm$\approx 6.01$ mm, in particular $0.018 \cdot 167$ mm$\approx 3.01$ mm.

Additionally or alternatively, in one embodiment, $-0.006 \cdot H \leq a_y$ is valid, in particular $-0.003 \cdot H \leq a_y$, and/or $-0.100 \leq b_y \leq 0.100$, in particular $-0.050 \leq b_y \leq 0.050$. For example, in one embodiment, if the height H of the blade element amounts to approximately 167 mm, then correspondingly, in one embodiment, the linear (y)-lean at the tip of the blade element, for $b_y=0$, amounts to approximately $-0.006 \cdot 167$ mm$\approx -1.00$ mm, in particular $-0.003 \cdot 167$ mm$\approx -0.5$ mm.

It has been shown surprisingly that precisely these linear courses or components advantageously improve the stressing of the blade element; in particular, they can reduce a stressing on the leading edge advantageously.

In one embodiment, $-0.005 \cdot H \leq A$, in particular $-0.003 \cdot H \leq A$, is valid. For example, in one embodiment, if the height H of the blade element amounts to approximately 167 mm, then correspondingly in one embodiment, the maximum value of the sine component of the x-lean or sweep amounts to $-0.005 \cdot 167$ mm$\cdot 2 \approx -1.67$ mm, in particular $-0.0022 \cdot 167$ mm$\cdot 2 \approx -0.73$ mm. It has been shown surprisingly that precisely these values advantageously improve the stressing on the blade element; in particular, they can reduce a stressing on the leading edge advantageously.

In one embodiment, the radial height H of the blade element amounts to between 150 mm and 200 mm. It has been shown surprisingly that advantageous blades result precisely with such heights of the blade element.

In one embodiment, the blade or (each of) the blades has a shroud on the tip of the blade element. It has been shown surprisingly that precisely with (outer) shrouds, blade elements according to the invention lead to advantageous stressing.

In one embodiment, the blade(s) is or are a rotating blade or rotating blades for a compressor stage or a turbine stage, particularly one compressor stage or one turbine stage, in particular one that is axial, for a gas turbine, particularly for one gas turbine, in particular for an aircraft engine, particularly one aircraft engine.

In an enhancement, the stage or blade(s) is or are distanced from an upstream-most or first stage, relative to the flow, and/or a downstream-most or last stage or rotating blade of the compressor or of the turbine. In other words, the rotating blade or stage can be, in particular, an intermediate rotating blade or stage, for example, a third stage or blade (in the direction of through-flow). It has been shown surprisingly that rotating blades according to the invention here are particularly advantageous.

In one embodiment, the rotating blade is or will be fastened to a rotor in a detachable manner, for example, by means of a fir tree root. It has been shown surprisingly that blade elements according to the invention here are particularly advantageous.

In one embodiment, a rotating blade is or will be designed in the way described here, in particular by first designing the local sine function and subsequently the linear course or component for the x-lean or sweep.

BRIEF DESCRIPTION OF THE DRAWING FIGURES

Figure 2:
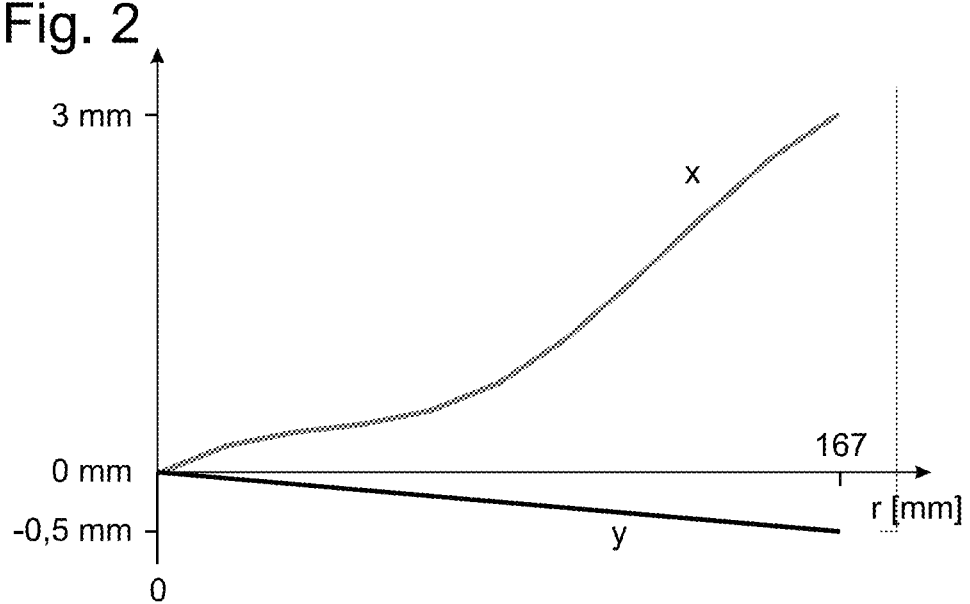

Additional advantageous enhancements of the present invention can be taken from the following description of preferred embodiments. For this purpose and partially schematized:

FIG. 1 shows a rotating blade of a turbomachine according to an embodiment of the present invention in a top view toward a second direction; and FIG. 2 shows the course of the stacking axis of the blade element of the rotating blade in a first direction and in the second direction.

DESCRIPTION OF THE INVENTION

FIG. 1 shows a rotating blade of a turbomachine according to one embodiment of the present invention in a view parallel to a radial direction R and to a first direction X parallel to a principal axis of the turbomachine (horizontal in FIG. 1).

The rotating blade has a blade element 10 with a suction side 11 and a pressure side, which is not visible in the view of FIG. 1, the sides being joined by an upstream leading edge 12 and a downstream trailing edge 13, and the blade has a shroud 2 on the tip of the blade element.

FIG. 2 shows the course of a stacking axis S of the blade element 10 indicated by the broken line in FIG. 1 in the first direction X (FIG. 2: "x") and in a second direction Y (FIG. 2: "y"), wherein the first direction X, the second direction Y, and the radial direction R in this sequence form a valid system, i.e., the second direction Y is perpendicular to the plane of the drawing of FIG. 1.

In FIG. 2 it is recognized that the blade element in the exemplary embodiment has a negative linear (y)-lean, which amounts to 0 mm at r=0 mm and −0.5 mm at r=H=167 mm, over its blade element height H, i.e., between r/H=0 and r/H=1. The x-lean or sweep in the first direction, in contrast, is composed of a positive linear component, which amounts to 0 mm at r=0 mm and 3 mm at r=H=167 mm, and a local sine function, which has precisely one full period, wherein the period corresponds approximately to the height of the blade element, and the local sine function at the root of the blade element (bottom in FIG. 1) and at the tip of the blade element (top in FIG. 1) is equal to zero and has a maximum negative value of −0.75 mm at approximately half the height of the blade element.

In a modification, which is not shown, for example, the local sine function can be different from zero in a radial region between approximately r/H=0 and r/H=0.3 and can have a full period, wherein the maximum negative value, for example, of −1 mm can lie at approximately r/H=0.15.

In the exemplary embodiment, although in the entire radial region r/H=[0, 1], the stacking axis S of the blade element 10 does not deviate or deviates only slightly from the linear course y in the second direction Y, or from the superimposed course x in the first direction X, it may also have another course in a modification, in particular in the region r/H<0.1 and/or r/H>0.75.

Although exemplary embodiments were explained in the preceding description, it shall be noted that a plurality of modifications is possible. In addition, it shall be noted that the exemplary embodiments only involve examples that in no way shall limit the scope of protection, the applications and the construction. Rather, a guide is given to the person skilled in the art by the preceding description for implementing at least one exemplary embodiment, whereby diverse changes, particularly with respect to the function and arrangement of the described components, can be carried out without departing from the scope of protection, as it results from the claims and combinations of features equivalent to these.

What is claimed is:

1. A rotating blade for a compressor stage or a turbine stage of an aircraft engine, comprising:
a blade element for deflecting the flow, with a pressure side and a suction side, these sides being joined by a leading edge and a trailing edge, wherein a stacking axis of the blade element, in the radial direction over a radius r from a root of a blade element at r=0 to a tip of a blade element at r=H,
has a course x(r) in a first downstream direction perpendicular to the radial direction and parallel to a principal axis of the turbomachine, this course deviating from a superimposed course $x_l(r)+x_s(r)$, which is composed of an addition of a particularly positive, linear course $x_l(r)=a_x \cdot (r/H+b_x)$ and a local sine function, $$x_s(r) = \begin{cases} A \cdot \left[ \sin\left( B \cdot \left( \frac{r}{H} + C \right) \right) + 1 \right] \Leftrightarrow -\frac{\pi}{2} \leq B \cdot \left( \frac{r}{H} + C \right) \leq \frac{3 \cdot \pi}{2} \\ 0 \Leftrightarrow \text{else} \end{cases}$$

by a maximum of $0.100 \cdot a_x \cdot (1+b_x)$, at least in a radial region between $r=0.200 \cdot H$ and $r=0.400 \cdot H$; and
has a course y(r) in a second direction perpendicular to the radial direction and to the first direction, this course deviating from a particularly negative, linear course $a_y \cdot (r/H+b_y)$ by a maximum of $0.100 \cdot a_y \cdot (1+b_y)$, at least in the radial region between $r=0.200 \cdot H$ and $r=0.400 \cdot H$,
wherein:
$A<0$,
$1.800 \cdot \pi \leq B \leq 2.200 \cdot \pi$ or $6.300 \cdot \pi \leq B \leq 7.000 \cdot \pi$,
$-0.300 \leq C \leq -0.200$ or $-0.100 \leq C \leq -0.050$,
$0<a_x$,
$a_y<0$,
$a_x \leq 0.036 \cdot H$,
$-0.100 \leq b_x \leq 0.100$,
$-0.006 \cdot H \leq a_y$,
$-0.100 \leq b_y \leq 0.100$, and
$-0.005 \cdot H \leq A$, and
wherein H is the radial height of the blade element.

2. The rotating blade according to claim 1, wherein the radial height H of the blade element is between 150 mm and 200 mm.

3. The rotating blade according to claim 1, wherein the blade has a shroud at the tip of the blade element.

4. The rotating blade according to claim 1, wherein the at least one rotating blade is in a compressor stage or a turbine stage of an aircraft engine.

5. The rotating blade according to claim 1, wherein the rotating blade is fastened in detachable manner to a rotor.

6. The rotating blade according to claim 5, wherein the rotating blade is in an aircraft engine, having at least one compressor stage or one turbine stage.

* * * * *